United States Patent
Yanai et al.

(10) Patent No.: US 8,558,831 B2
(45) Date of Patent: *Oct. 15, 2013

(54) METHOD AND PROGRAM FOR DRAWING DISTRIBUTION AREA OF DATA POINTS ON COORDINATE PLANE

(75) Inventors: Hirokazu Yanai, Osaka (JP); Junichi Konishi, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 222 days.

This patent is subject to a terminal disclaimer.

(21) Appl. No.: 13/082,743

(22) Filed: Apr. 8, 2011

(65) Prior Publication Data

US 2011/0249031 A1 Oct. 13, 2011

(30) Foreign Application Priority Data

Apr. 12, 2010 (JP) ................. 2010-091631

(51) Int. Cl.
 *G06T 17/00* (2006.01)
 *G01B 5/26* (2006.01)
 *G06K 9/00* (2006.01)
(52) U.S. Cl.
 USPC ............................ 345/420; 702/156; 382/145
(58) Field of Classification Search
 USPC ........... 345/440; 382/144–151, 181, 224–228
 See application file for complete search history.

(56) References Cited

U.S. PATENT DOCUMENTS

| 5,844,850 A | 12/1998 | Tsutsui et al. | |
|---|---|---|---|
| 7,557,803 B2 * | 7/2009 | Furukawa et al. | 345/420 |
| 2004/0188609 A1 | 9/2004 | Miyai et al. | |
| 2010/0110078 A1 * | 5/2010 | Yanai | 345/440 |

FOREIGN PATENT DOCUMENTS

| JP | 3639636 | 1/2005 |
|---|---|---|
| JP | 3888938 | 12/2006 |
| JP | 3944439 | 4/2007 |
| JP | 2007-248198 | 9/2007 |
| JP | 2010-108236 | 5/2010 |

* cited by examiner

*Primary Examiner* — Ulka Chauhan
*Assistant Examiner* — Andrew J Gill
(74) *Attorney, Agent, or Firm* — Cooper & Dunham LLP

(57) ABSTRACT

Disclosed is a method for drawing a distribution area of data points on a coordinate plane. The method includes a step in which a data point is selected as a first representative point; a step in which the data point corresponding to a direction in which a minimum angle is formed with respect to a first direction in a rotation direction is selected as a second representative point; a step in which the data point corresponding to a direction in which a minimum angle is formed with respect to a next direction in the rotation direction is selected as a next representative point, the step repeatedly selecting the next representative point; and a step in which the representative points are connected by a line to draw a distribution area indication line.

14 Claims, 10 Drawing Sheets

FIG.2

| DATA NO. | ATTRIBUTE | NUMERIC DATA A | NUMERIC DATA B | NUMERIC DATA C |
|---|---|---|---|---|
| 1 | Z1 | 6 | 6 | 6.48 |
| 2 | Z2 | 6 | 7 | 7.48 |
| 3 | Z1 | 6.62 | 6.43 | 6.9 |
| 4 | Z2 | 7 | 7 | 7.48 |
| 5 | Z1 | 7 | 6.48 | 6.95 |
| 6 | Z2 | 7.1 | 8.19 | 8.19 |
| 7 | Z1 | 7.62 | 7.33 | 7.81 |
| 8 | Z2 | 7.62 | 6.48 | 6.95 |
| 9 | Z1 | 8 | 8.3 | 7.95 |
| 10 | Z2 | 8 | 9 | 8.67 |
| 11 | Z1 | 8.33 | 6.52 | 7 |
| 41 | Z1 | 8.38 | 10.38 | 10 |
| 42 | Z2 | 12.05 | 9.19 | 10.76 |
| 43 | Z1 | 12.05 | 13.62 | 9.67 |
| 44 | Z2 | 12.33 | 11.48 | 9.81 |
| 45 | Z1 | 12.43 | 10.57 | 9.24 |
| 46 | Z2 | 12.52 | 12.33 | 9.86 |
| 47 | Z1 | 12.67 | 12.76 | 10.71 |
| 48 | Z2 | 12.9 | 13.57 | 10.9 |
| 49 | Z1 | 13.62 | 13.76 | 10.19 |
| 50 | Z2 | 13.62 | 13.05 | |

METHOD AND PROGRAM FOR DRAWING DISTRIBUTION AREA OF DATA POINTS ON COORDINATE PLANE

BACKGROUND OF THE INVENTION

1. Field of the Invention

The present invention relates to a method for drawing the distribution area of data points on a coordinate plane and a program for causing a computer to execute the method.

2. Description of the Related Art

Generally, coordinate planes are often used to express relationships between plural data having a pair of variables. Further, the relationships between the plural data having the pair of variables can be digitized by finding regression straight lines and regression curved lines with respect to data groups containing the plural data. For example, Patent Documents 1 through 3 disclose methods for expressing the characteristics of distribution of data points on coordinate planes.

Furthermore, in a case where there is information that classifies data points into layers, the colors and shapes of marks indicating the data points are changed to express the data points on the coordinate planes. Thus, distribution of the data points of the plural layers can be expressed on a single coordinate plane.

As described above, the coordinate planes are suitable for expressing the relationships between the plural data having the pair of variables.

However, if the single coordinate plane displays a large number of the layers and the data points, the marks indicating the data points are overlapped with each other, which results in a difficulty in recognizing the characteristics of the distribution of the data points in the respective layers.

Moreover, without being limited to the coordinate planes on which the plural layers are displayed, small figures per se cause the marks indicating the data points to be reduced in size, which results in a difficulty in recognizing the characteristics of the distribution of the data points.

In order to overcome such difficulties, known methods draw probability ellipses for the respective layers. However, the probability ellipse does not accurately express actual distribution of data points.

Patent Document 1: JP-B2-3639636
Patent Document 2: JP-B2-3944439
Patent Document 3: JP-A-2007-248198
Patent Document 4: JP-B2-3888938

SUMMARY OF THE INVENTION

The present invention may have an object of providing a method for drawing the distribution area of data points on a coordinate plane where the distribution area of the data points can be drawn by a method different from a method using probability ellipses, and providing a program for drawing the distribution area of the data points on the coordinate plane.

An embodiment of the present invention provides a method for drawing a distribution area of data points on a coordinate plane. The method includes a first step of selecting representative points in which any one data point of a data group containing plural data having a pair of variables is selected as a first representative point on the coordinate plane where the data of the data group are expressed as points; a second step of selecting the representative points in which assuming that one of a clockwise direction and a counterclockwise direction is set as a rotation direction for making selection, the first representative point is set as a first standard point, and one direction passing through the first standard point is set as a first direction for selecting a corresponding one of the representative points, the data point corresponding to a direction, in which a minimum angle is formed with respect to the first direction for selecting the corresponding one of the representative points in the rotation direction for making selection as viewed from the first direction for selecting the corresponding one of the representative points, among plural first directions of the data points toward the respective data points via the first standard point is selected as a second representative point; a third step of selecting the representative points in which assuming that the second representative point or an immediately preceding representative point which is a representative point selected in the third step and a most recently selected representative point is set as a next standard point, the standard point used for selecting the immediately preceding representative point is set as an immediately preceding standard point, and any direction within 180 degrees in the rotation direction for making selection from a direction toward the immediately preceding standard point via the next standard point is set as a next direction for selecting the corresponding one of the representative points, the data point corresponding to a direction, in which a minimum angle is formed with respect to the next direction for selecting a corresponding one of the representative points in the rotation direction for making selection as viewed from the next direction for selecting the corresponding one of the representative points, among plural next directions of the data points toward the respective data points other than the immediately preceding representative point via the next standard point is selected as a next representative point, the third step repeatedly performing processing of selecting the next representative point; and a step of drawing the distribution area in which the representative points are connected by a line to draw a distribution area indication line.

Other objects, features and advantages of the present invention will become more apparent from the following detailed description when read in conjunction with the accompanying drawings.

BRIEF DESCRIPTION OF THE DRAWINGS

FIG. 2 is a table in which parts of data used in the embodiment are shown;

DETAILED DESCRIPTION OF THE PREFERRED EMBODIMENTS

Figure 1:
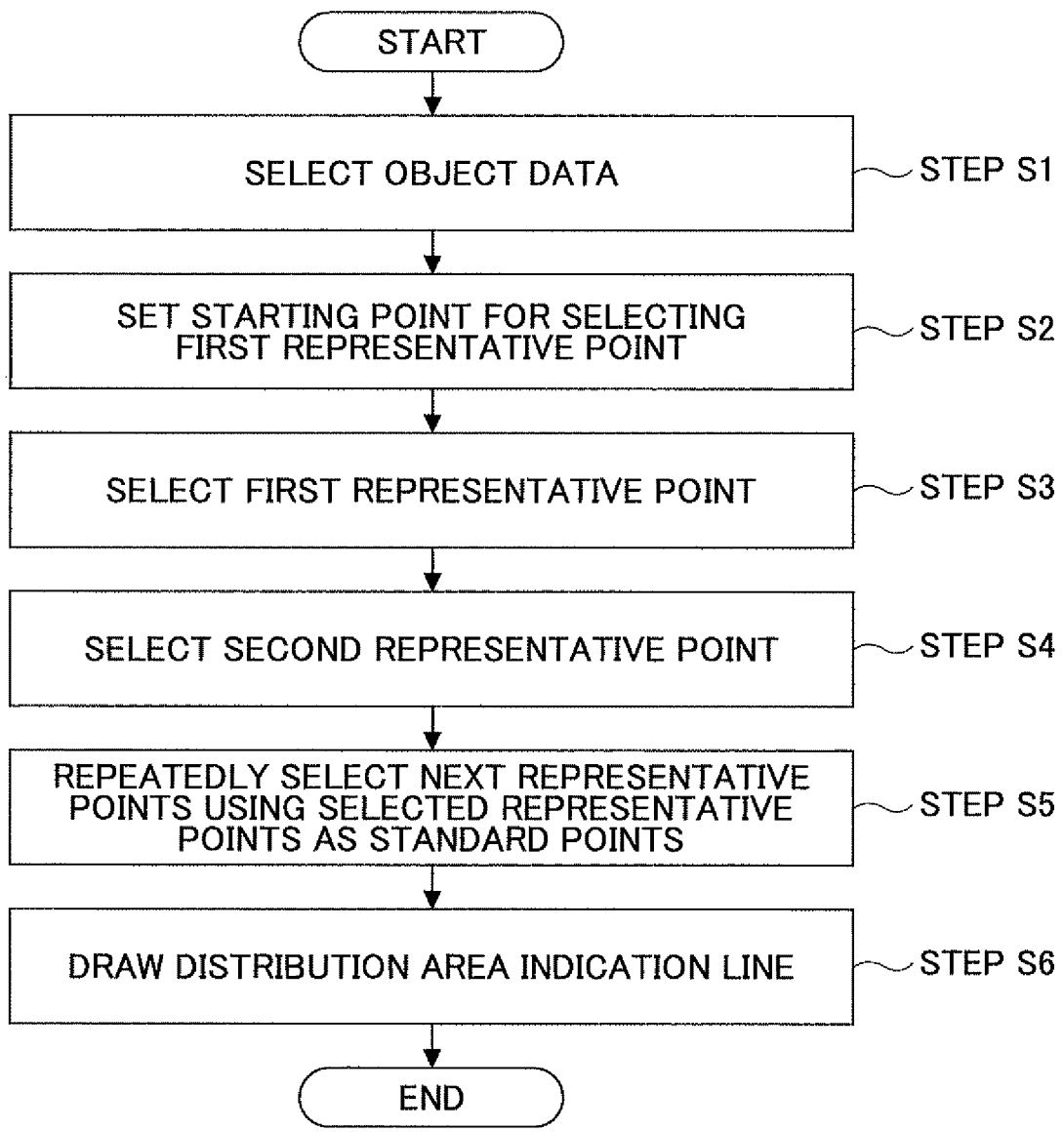
FIG. 1 is a flowchart for describing an embodiment of the present invention.
Figure 3:
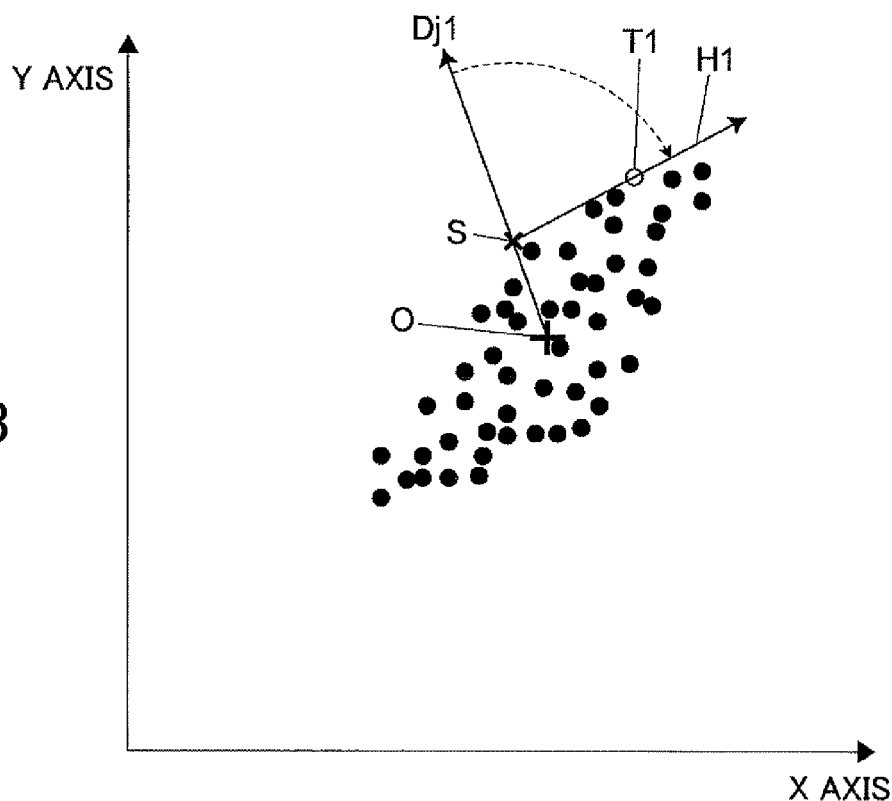
FIG. 3 is a graph illustrating a coordinate plane on which the data shown in FIG. 2 are expressed as data points and describing the flow of finding a first representative point.
Figure 4:
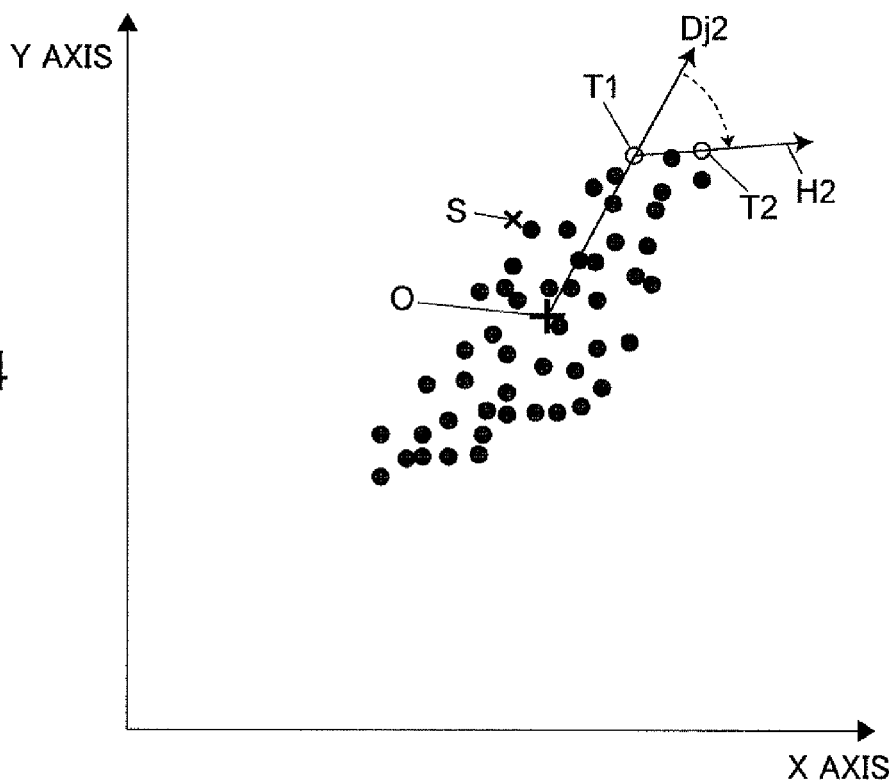
FIG. 4 is a graph illustrating the coordinate plane and describing the flow of finding a second representative point with the first representative point as a next standard point.
Figure 5:
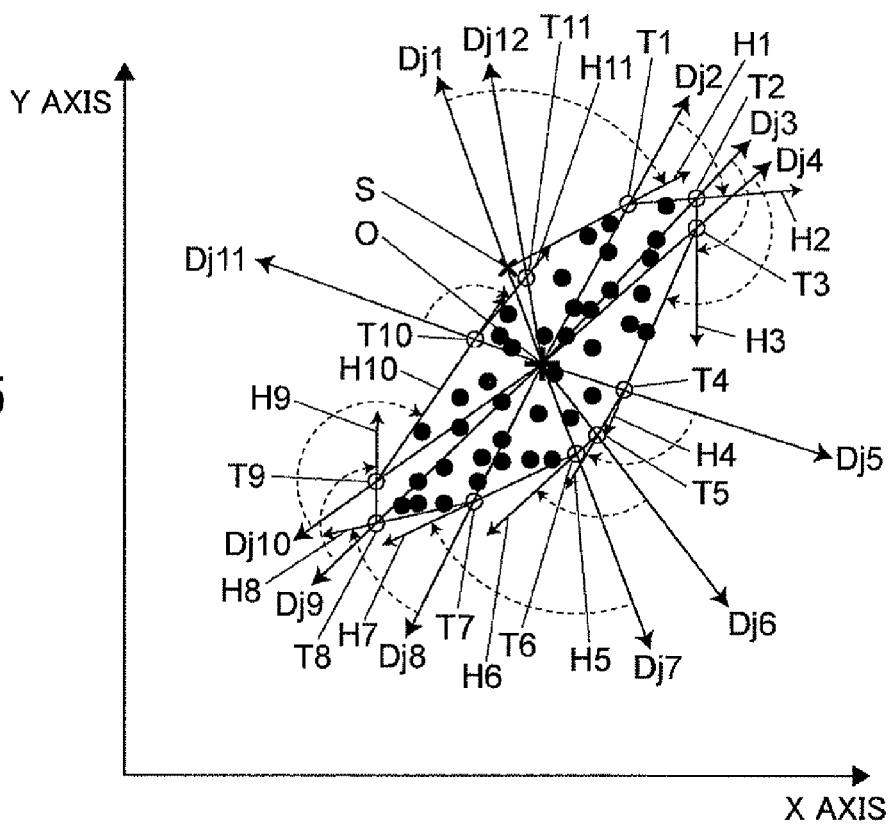
FIG. 5 is a graph illustrating the coordinate plane on which are shown a standard point for selecting the first representative point, directions of the data points, representative points, and directions for making determination used until the last one of the representative points is found.
Figure 6:
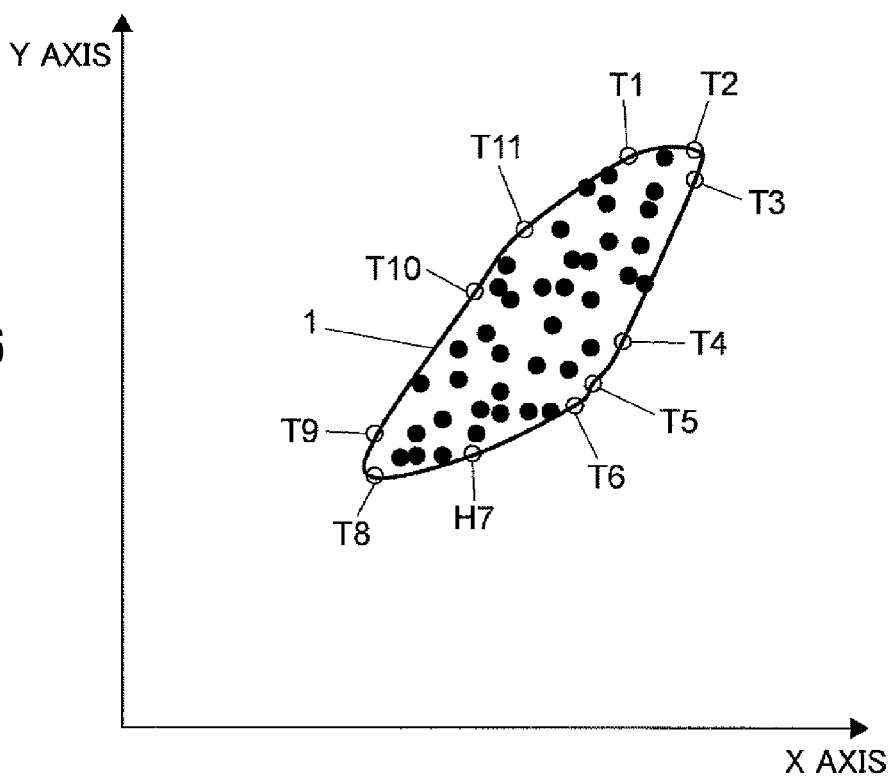
FIG. 6 is a graph illustrating the coordinate plane on which a distribution area indication line is shown.

FIG. 1 is a flowchart for describing an embodiment of the present invention. FIG. 2 is a table in which parts of data used in this embodiment are shown. FIG. 3 is a graph illustrating a coordinate plane on which the data shown in FIG. 2 are expressed as data points and describing the flow of finding a first representative point. FIG. 4 is a graph illustrating the coordinate plane and describing the flow of finding a second representative point with the first representative point as a next standard point. FIG. 5 is a graph illustrating the coordinate plane on which are shown a standard point for selecting the first representative point, directions of the data points, representative points, and directions for making determination used until the last one of the representative points is found. FIG. 6 is a graph illustrating the coordinate plane on which a distribution area indication line is shown.

This embodiment is described below with reference to FIGS. 1 through 6.

Step S1: Two types of associated numeric data to be drawn on the graph are selected. Here, it is assumed that the numeric data A and the numeric data B of the table shown in FIG. 2 are selected. Note that no attributes of the data are taken into consideration.

Step S2: Any point on the coordinate plane, in which the numeric data A and the numeric data B are drawn along an X-axis and a Y-axis, respectively, is set as a standard point S for selecting the first representative point (a step of setting the standard point for selecting the first representative point). Further, any point on the coordinate plane having a coordinate different from that of the standard point S is set as a central point O for making determination (a step of setting the central point for making determination).

The central point O for making determination is arranged inside an area obtained by connecting all the data points to one another by a line. In this embodiment, the central point O for making determination is set at the geometric center of the distribution area of the data points. Here, the geometric center of the distribution area of the data points refers to the point of a value obtained by finding an average for each of the variables with respect to plural data having the pair of variables.

Further, the arrangement position of the standard point S for selecting the first representative point is not particularly limited so long as the coordinates of the points S and O are different from each other. In this embodiment, the standard point S for selecting the first representative point is set at a position shown in FIG. 3.

Step S3: As shown in FIG. 3, a direction from the central point O for making determination to the standard point S is set as a first direction Dj1 for making determination. In this embodiment, the direction Dj1 also serves as a direction for selecting the first representative point. Either a clockwise direction or a counterclockwise direction is set as a rotation direction for selecting the first representative point. Here, the clockwise direction is set as the rotation direction for selecting the first representative point. The data point corresponding to a direction H1 for selecting the first representative point, in which a minimum angle is formed with respect to the direction Dj1 for selecting the first representative point in the clockwise direction as viewed from the direction Dj1 for selecting the first representative point, among plural directions of the data points for selecting the first representative point toward the respective data points via the standard point S for selecting the first representative point is selected as the first representative point T1 (a step of selecting the first representative point). The step of setting the standard point for selecting the first representative point and the step of selecting the first representative point constitute a first step of selecting the representative points.

FIG. 3 shows, among the plural directions of the data points for selecting the first representative point, only the direction H1 of the data point for selecting the first representative point obtained when the first direction Dj1 for making determination serving also as the direction for selecting the first representative point is rotated clockwise about the standard point S and first overlapped with the data point. In FIG. 3, the first direction Dj1 for making determination is rotated, but it is not required to be rotated in actual processing. The angles in the respective directions of the data points for selecting the first representative point, which are formed with respect to the direction Dj1 for selecting the first representative point in the clockwise direction as viewed from the direction Dj1 for selecting the first representative point, can be found by a trigonometric function. The data point corresponding to the minimum angle among those found for the respective directions of the data points for selecting the first representative point is set as the first representative point T1.

Note that in the following embodiments and drawings as well as this embodiment, the directions for selecting the representative points are rotated about the standard points, but they are not required to be rotated in actual processing. In respective processing steps, the angles in the rotation directions of the data points for selecting the representative points, which are formed with respect to the directions for selecting the representative points as viewed from the directions for selecting the representative points, can be found by a trigonometric function.

Step S4: As shown in FIG. 4, a direction from the central point O for making determination to the first representative point T1 is set as a direction Dj2 for making determination. The direction Dj2 also serves as a first direction for selecting the representative point. Either a clockwise direction or a counterclockwise direction is set as a rotation direction for making selection. The rotation direction for making selection may be the same as or opposite to the rotation direction for selecting the first representative point. Here, the clockwise direction is set as the rotation direction for making selection. The first representative point T1 found in step S3 is set as a first standard point.

The data point corresponding to a direction H2, in which a minimum angle is formed with respect to the direction Dj2 for selecting the representative point in the clockwise direction as viewed from the direction Dj2 for selecting the representative point, among plural directions of the data points toward the respective data points via the first standard point T1 is selected as a second representative point T2 (a second step of selecting the representative points).

Step S5: As shown in FIG. 5, a direction from the central point O for making determination to the second representative point T2 is set as a direction Dj3 for making determination. The direction Dj3 also serves as a direction for selecting a next representative point. The second representative point T2 found in step S4 is set as a next standard point.

The data point corresponding to a direction H3, in which a minimum angle is formed with respect to the direction Dj3 for selecting the representative point in the clockwise direction as viewed from the direction Dj3 for selecting the representative point, among plural directions of the data points toward the respective data points via the next standard point T2 is selected as a third representative point T3.

Then, assuming that directions toward the most recently selected representative points (the immediately preceding representative points) are set not only as the directions for making determination but also as the directions for selecting the representative points, and the immediately preceding representative points are set as the next standard points, the data points corresponding to the directions, in which minimum angles are formed with respect to the directions for selecting the representative points in the clockwise direction as viewed from the directions for selecting the representative points, among the plural directions of the data points toward the respective data points via the next standard points are selected as the representative points. The processing steps of selecting the representative points are repeatedly performed until the direction for making determination is rotated clockwise by 360 degrees or more with respect to the first direction Dj1 for making determination or until the same data point is selected again as the representative point. In this embodiment, after the representative point T3 is selected, representative points T4 through T11 are selected using Dj4 through Dj11 each serving not only as the direction for making determination but also as the direction for selecting the representative point.

After the representative point T11 is selected, a direction from the central point O for making determination to the representative point T11 is found as a direction Dj12 for making determination. As shown in FIG. 5, the direction Dj12 for making determination is positioned ahead of the first direction Dj1 for making determination in the clockwise direction as viewed from the immediately preceding direction Dj11 for making determination. Therefore, it is determined that the direction for making determination is rotated clockwise by 360 degrees or more with respect to the first direction Dj1 for making determination. Thus, the processing steps of selecting the representative points (a third step of selecting the representative points) are completed.

Step S6: A line passing through the representative points T1 through T11 is drawn to indicate the distribution area indication line (a step of drawing the distribution area). As shown in FIG. 6, in this processing step, the representative points T1 through T11 are connected to one another by a smooth curved line in the order in which they are selected, and the first selected representative point T1 and the last-selected representative point T11 are connected to each other by the smooth curved line to draw a distribution area indication line 1. This smooth curved line can be drawn by a software program such as the Draw Closed Curve function of Visual Basic capable of drawing a smooth curved line passing through specific points. Note, however, that the distribution area indication line 1, which connects the representative points to one another, may be a straight line.

As described above, in this embodiment, the distribution area of the data points can be expressed in such a manner as to be surrounded by the distribution area indication line 1.

In the above embodiment, the processing steps of selecting the representative points are completed when the direction for making determination is rotated clockwise by 360 degrees or more with respect to the first direction Dj1 for making determination. However, the processing steps of selecting the representative points may be performed until the same data point, e.g., the representative point T1 in the above embodiment, is selected again as the representative point.

Note that in a case where the processing steps of selecting the representative points are completed when the same data point is selected again as the representative point, the last-selected representative point having the same data point and the coordinates as those of the previously-selected representative point may or may not be recognized as the representative point. If the last-selected representative point is recognized as the representative point, the line that passes through the representative points in the order in which they are selected is drawn in the step of drawing the distribution area, thereby drawing the closed distribution area indication line. If the last-selected representative point is not recognized as the representative point, the line that returns to the first selected representative point after passing through the representative points in the order in which they are selected is drawn in the step of drawing the distribution area, thereby drawing the closed distribution area indication line.

Further, in the step (step S6) of drawing the distribution area in the above embodiment, the distribution area indication line 1 is drawn after the processing steps of selecting the representative points T1 through T11 are completed. However, the distribution area indication line may be drawn in parallel with the processing steps of selecting the representative points. In other words, in the step of drawing the distribution area, every time the respective representative points T2 through T11 are selected in the second step (step S2) of selecting the representative points and the third step (step S5) of selecting the representative points, the selected representative points and the corresponding immediately preceding representative points may be connected to one another by the line and the last-selected representative point T11 and the first selected representative point T1 are connected to each other by the line to draw the distribution area indication line 1.

Further, as described above, the representative points selected in the second step of selecting the representative points and the third step of selecting the representative points and the immediately preceding representative points are consecutively connected to one another by the line in the step of drawing the distribution area. Here, if the same data point is selected again as the representative point in the third step of selecting the representative points, the representative point selected again and the immediately preceding representative point are connected to each other by the line to draw the distribution area indication line in the step of drawing the distribution area. Thus, the processing step of drawing the distribution area indication line is completed.

Further, in the above embodiment, the representative points T1 through T11 are connected to one another by the line in the order in which they are not crossed together to draw the distribution area indication line 1. However, not being limited to this, in another embodiment of the present invention, the distribution area indication line may be drawn in such a manner that each of the respective representative points is connected to all the other representative points by lines.

Figure 7:
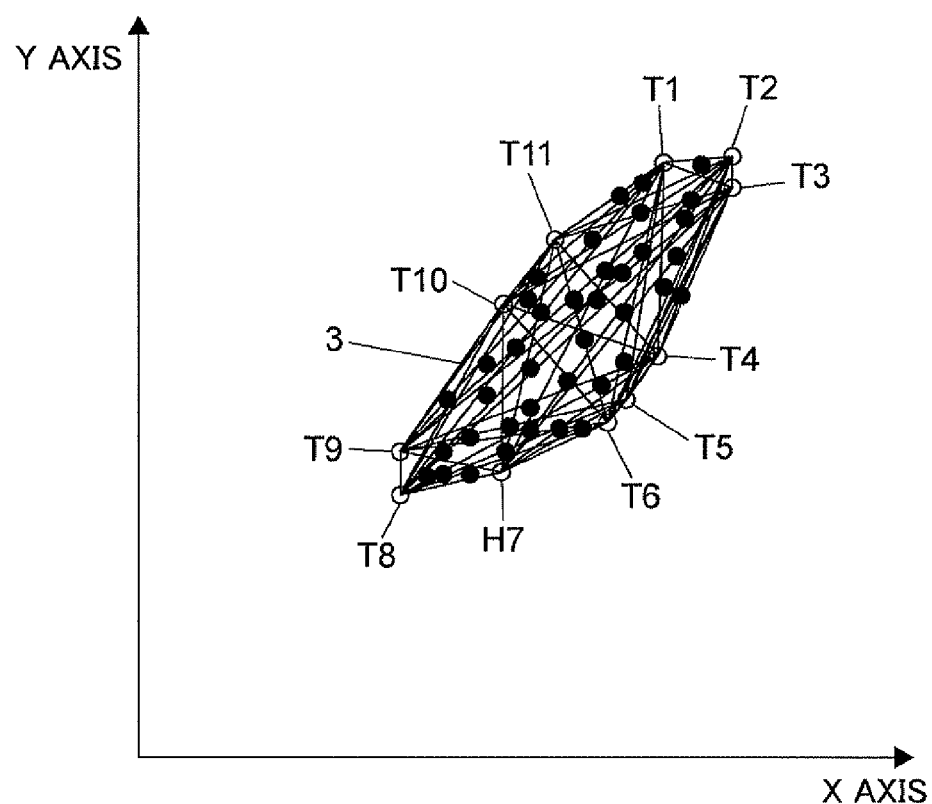
FIG. 7 is a graph illustrating the coordinate plane on which another distribution area indication line is shown.

For example, as shown in FIG. 7, a distribution area indication line 3 may be drawn by connecting each of the representative points T1 through T11 to all the other representative points by the lines with respect to the representative points shown in FIG. 6. Also in this case, the contour of the distribution area of the data points can be appropriately expressed. In FIG. 7, each of the representative points are connected to all the other representative points by the straight lines. However, the line expressing the contour of the distribution area indication line 3 may be a curved line similar to that shown in FIG. 6.

Further, in the above embodiment, the directions Dj2 through Dj11 for making determination are set as the directions for selecting the representative points in the second step (step S4) of selecting the representative points and the third step (step S5) of selecting the representative points, but the directions for selecting the representative points are not limited to the directions Dj2 through Dj11. However, if any directions are set as the directions for selecting the representative points, there may occur problems in selecting the appropriate representative points; the lines indicating the distribution area may be overlapped with each other, the distribution area indication line may not be closed, and some of the data points may protrude from the distribution area indication line even if the distribution area indication line is closed.

In order to prevent such problems, the direction for selecting the representative point in the second step of selecting the representative points is, when being rotated clockwise (in the rotation direction for selecting the first representative point), only required to be within 180 degrees from the direction toward the standard point S for selecting the first representative point via the first standard point T1. Further, the directions for selecting the representative points in the third step of selecting the representative points are, when being rotated clockwise (in the rotation direction for selecting the first representative point), only required to be within 180 degrees from the directions toward the immediately preceding standard points (the standard points used for selecting the immediately preceding representative points) via the next standard points (the immediately preceding representative points). Note that in the third step of selecting the representative points, the immediately preceding standard points are the representative points selected before the immediately preceding representative points. Therefore, when the directions for selecting the representative points are set in the directions toward the immediately preceding standard points via the next standard points, the data points constituting the immediately preceding standard points are eliminated from the objects to be selected as the representative points in the third step of selecting the representative points.

Figure 8:
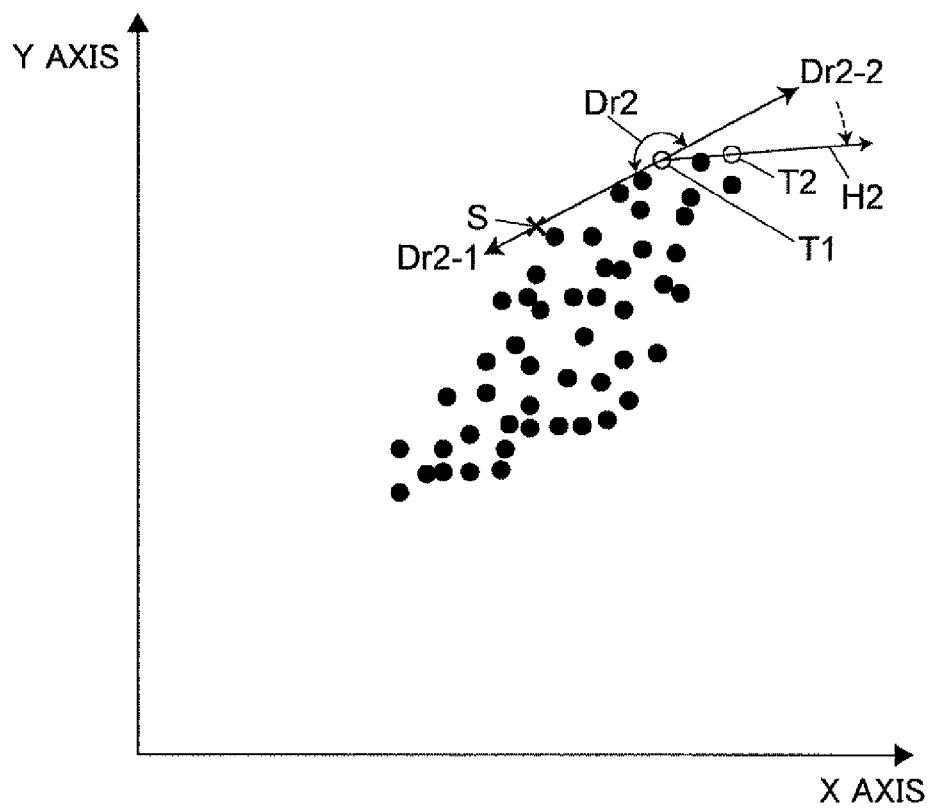
FIG. 8 is a graph for describing the range of a direction for selecting the representative point in a second step of selecting the representative points.

FIG. 8 is a graph for describing the range of the direction for selecting the representative point in the second step (step S4) of selecting the representative point.

A range Dr2 in the direction for selecting the representative point may be within the range of a direction Dr2-2 obtained when a direction Dr2-1 toward the standard point S for selecting the first representative point is rotated clockwise (in the rotation direction for selecting the first representative point) by 180 degrees with the first standard point (the first representative point) T1 as a starting point. Since the direction Dr2-2 is the same as the direction H1 of the data point (see FIG. 3), no data points exist in the range Dr2 with respect to a straight line extending in the direction Dr2-1 and the direction Dr2-2 via the representative point T1. Accordingly, the direction for selecting the representative point in the second step (S4) of selecting the representative points may be any direction so long as it is set within the range Dr2.

Further, in the third step of selecting the representative points in the above embodiment, the processing steps of selecting the representative points are completed when the directions Dj2 through Dj12 for making determination, each of which is set every time the corresponding representative point is selected, are rotated by 360 degrees or more with respect to the first direction Dj1 for making determination. However, the present invention may not use the directions for making determination. In this case, the processing steps of selecting the representative points in the third step of selecting the representative points are completed when the same data point is selected again as the representative point or when at least two of the data points are selected again as the representative points.

However, since the directions Dj1 through Dj11 for making determination are used as the directions for selecting the representative points in the above embodiment, the directions for selecting the representative points are required to be defined in a case where the directions for making determination are not used. The direction for selecting the first representative point set in the step of selecting the first representative point may be any direction. As described above, the direction for selecting the representative point set in the second step of selecting the representative points is, when being rotated clockwise (in the rotation direction for selecting the first representative point), only required to be within 180 degrees from the direction toward the standard point for selecting the first representative point via the first standard point (the first representative point). Further, as described above, the directions for selecting the representative points in the third step of selecting the representative points are, when being rotated clockwise (in the rotation direction for selecting the first representative point), only required to be within 180 degrees from the directions toward the immediately preceding standard points (the standard points used for selecting the immediately preceding representative points) via the next standard points (the immediately preceding representative points).

Further, in the above embodiment, the standard point S for selecting the first representative point is arranged outside the area obtained by connecting all the data points to one another by the line. However, the arrangement position of the standard point S for selecting the first representative point may be any position. For example, the standard point for selecting the first representative point may be intentionally or unintentionally arranged inside the area obtained by connecting all the data points by the line. Next, the flow of this processing step according to the embodiment of the present invention is described below with reference to FIGS. 9 through 11.

Figure 9:
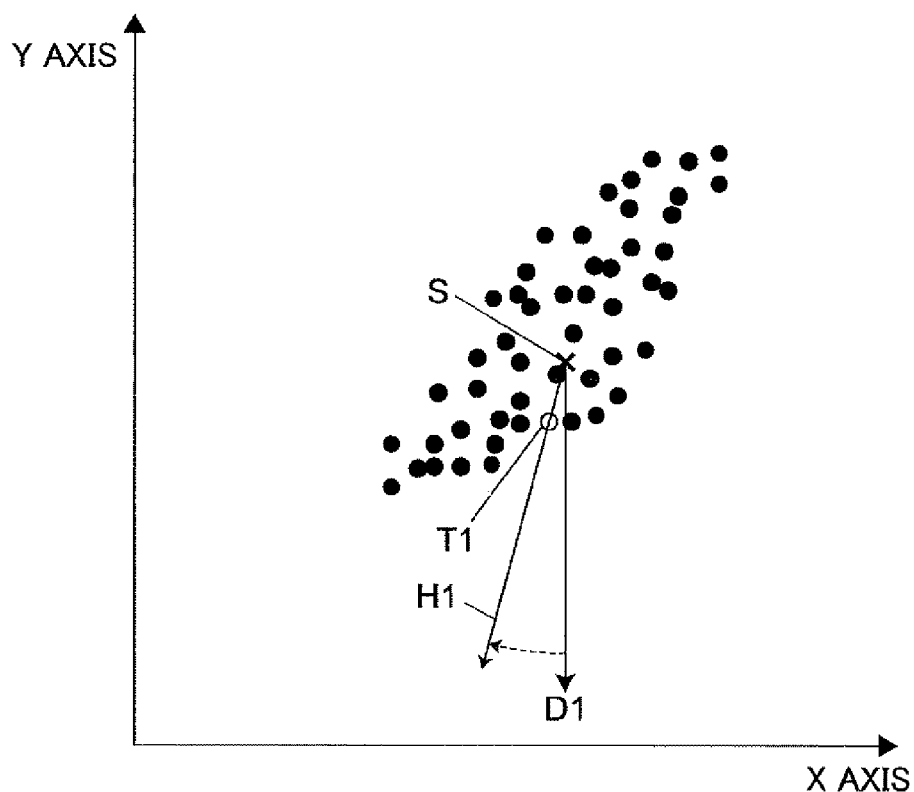
FIG. 9 is a graph illustrating the coordinate plane on which the data shown in FIG. 2 are expressed as the data points and describing the flow of finding the first representative point in a case where the standard point for selecting the first representative point is arranged inside a later drawn distribution area indication line.
Figure 10:
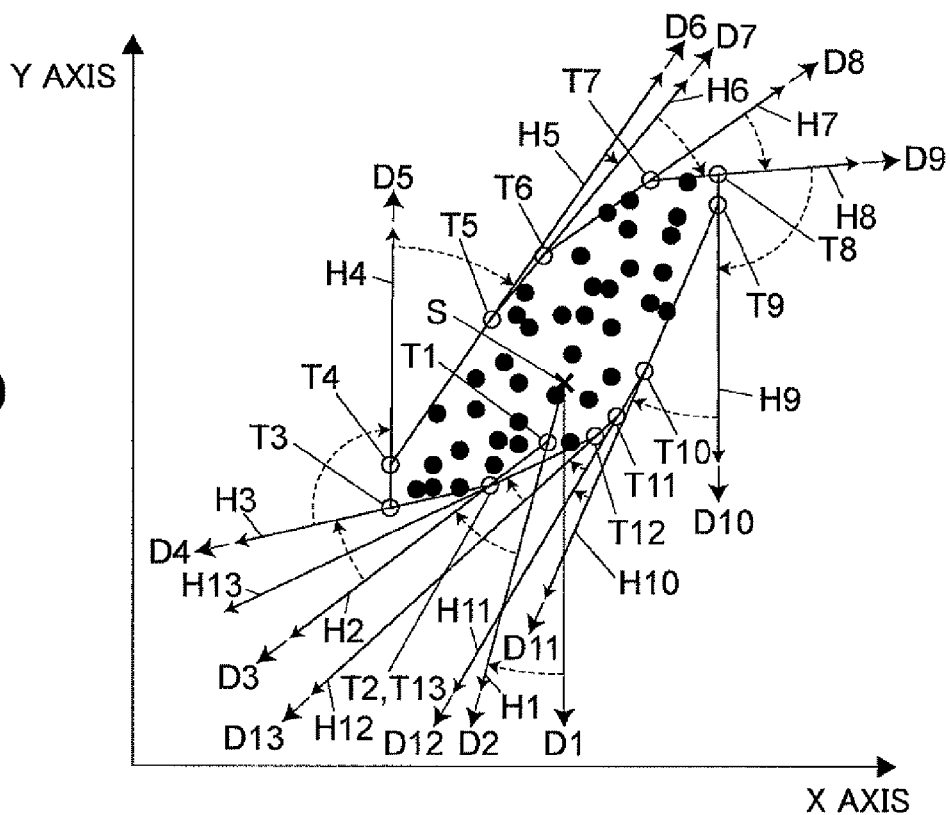
FIG. 10 is a graph illustrating the coordinate plane on which are shown the standard point for selecting the first representative point, directions for selecting the representative points, directions of the data points, and the representative points used until the last one of the representative points is found.
Figure 11:
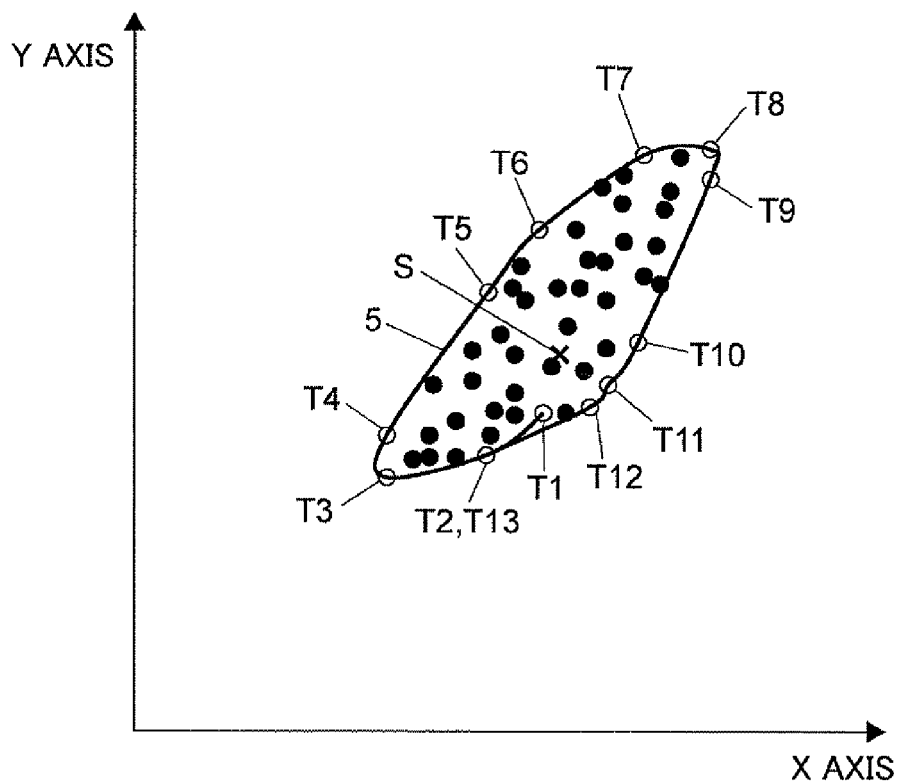
FIG. 11 is a graph illustrating the coordinate plane on which the distribution area indication line is shown.

FIG. 9 is a graph illustrating the coordinate plane on which the data shown in FIG. 2 are expressed as the data points and describing the flow of finding the first representative point in a case where the standard point for selecting the first representative point is arranged inside a later drawn distribution area indication line. FIG. 10 is a graph illustrating the coordinate plane on which are shown the standard point for selecting the first representative point, directions for selecting representative points, directions of the data points, and the representative points used until the last one of the representative points is found. FIG. 11 is a graph illustrating the coordinate plane on which the distribution area indication line is shown.

As shown in FIG. 9, the standard point S for selecting the first representative point is set in the step of setting the standard point for selecting the first representative point. Here, the standard point S for selecting the first representative point is unintentionally arranged inside an area obtained by connecting all the data points by a line. Note that if the standard point S for selecting the first representative point is intentionally arranged at, for example, the center or the geometric center of the distribution area of the data points in the step of setting the standard point for selecting the first representative point, the standard point S for selecting the first representative point is arranged inside the area obtained by connecting all the data points by the line. Here, the center of the distribution area of the plural data points refers to the point of a value obtained by adding up a maximum value and a minimum value and dividing the result by two for each variable with respect to plural data having the pair of variables.

In the step of selecting the first representative point, any direction passing through the standard point S for selecting the first representative point is set as a direction D1 for selecting the first representative point. The direction D1 for selecting the first representative point is, for example, parallel to a Y coordinate axis and toward a negative direction. The data point corresponding to a direction H1 for selecting the first representative point, in which a minimum angle is formed with respect to the direction D1 for selecting the first representative point in a clockwise direction as viewed from the direction D1 for selecting the first representative point, among plural directions of the data points for selecting the first representative point toward the respective data points via the standard point S for selecting the first representative point is selected as the first representative point T1.

Then, the second representative point T2 is selected in the second step of selecting the representative points, and the representative points T3 through T13 are selected in the third step of selecting the representative points. Here, a rotation direction for making selection is a clockwise direction, and directions D2 through D12 for selecting the representative points are directions H1 through H11 of the data points corresponding to the most recently selected representative points. After the representative point T12 is selected in the third step of selecting the representative points, the representative point T12 is set as a next standard point (an immediately preceding representative point). Then, the direction H12 of the data point corresponding to the representative point T12 is set as the direction D13 for selecting the representative point to select the representative point. As a result, the representative point T13 corresponding to the direction H13 of the data point is selected. Since the data point constituting the representative point 13 has been selected as the representative point T2, the processing steps of selecting the representative points are completed.

In the step of drawing a distribution area, the representative points T1 through T13 are connected by a smooth curved line in the order in which they are selected, thereby drawing a distribution area indication line 5 (see FIG. 11).

Here, since the data point as the representative point T2 also serves as the representative point T13, the representative point T12 and the representative point T13 are connected to each other by the line.

As described above, even in a case where the standard point S for selecting the first representative point is arranged inside the later drawn distribution area indication line 5, in the embodiment of the present invention, the distribution area indication line 5 can be drawn expressing the contour of the distribution area of the data points.

Figure 12:
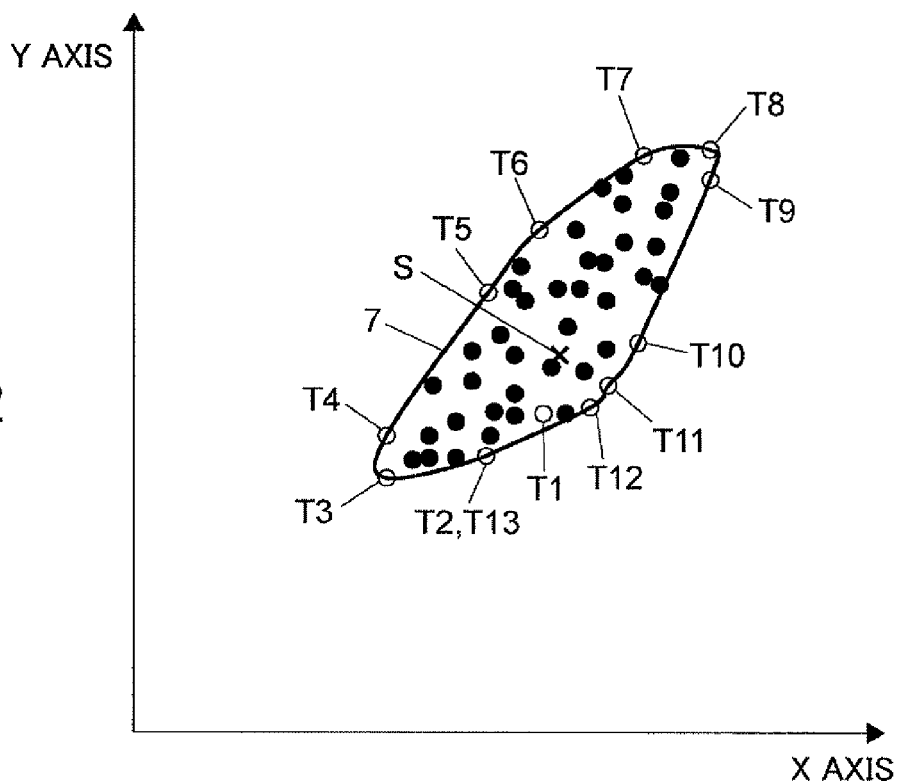
FIG. 12 is a graph illustrating the modified distribution area indication line.

The distribution area indication line 5 shown in FIG. 11 includes a line connecting the representative points T1 and T2 to each other in addition to the closing line that connects the representative points T2 through T13. If the distribution area indication line 5 is inconvenient, a distribution area indication line 7 is required to be drawn in such a manner that the line connecting the representative points T1 and T2 to each other is not drawn as shown in FIG. 12. Thus, the distribution area indication line 7 is drawn that expresses only the contour of the distribution area of the data points. Methods for not drawing the line that connects the representative points T1 and T2 to each other can include deleting the line per se and eliminating the representative point T1 when the distribution area indication line is drawn.

The representative point corresponding to a part to be deleted of the distribution area indication line or the representative point to be eliminated when the distribution area indication line is drawn is the representative point selected before the time at which the representative point selected again in the third step of selecting the representative points is first selected. In the above embodiment described with reference to FIGS. 9 through 11, the first representative point T1 is the representative point selected before the representative point T2 selected again as the representative point T13. Accordingly, as shown in FIG. 12, the line connected to the first representative point T1 is deleted or is not drawn.

Meanwhile, in the embodiment of the present invention, some of the data points in which a data group is displayed on the coordinate plane are necessarily selected as the representative points. The data points include the data point having a maximum X coordinate value, the data point having a minimum X coordinate value, the data point having a maximum Y coordinate value, and the data point having a minimum Y coordinate value in an X-Y coordinate system. Further, the data points include the data point having a maximum γ value in a polar coordinate system.

Furthermore, in the embodiment of the present invention, the standard point for selecting the first representative point is arranged at any coordinates. Therefore, the standard point for selecting the first representative point may be set at the coordinates of any data of the data group.

If the respective data constituting the data group are data in an X-Y orthogonal coordinate system or an X-Y nonorthogonal coordinate system, the embodiment of the present invention can draw the distribution area indication line expressing only the contour of the distribution area of the data points in such a manner that the coordinates of any of the data points necessarily selected as the representative point are set as the standard point for selecting the first representative point and any direction is set in a predetermined direction with respect to the standard point. (1) The predetermined direction is a direction toward any X-coordinate having a value greater than or equal to the maximum X coordinate value with the coordinates of the data having the maximum X coordinate value as a starting point if the coordinates of the data having the maximum X coordinate value are set as the standard point for selecting the first representative point. (2) The predetermined direction is a direction toward any X-coordinate having a value less than or equal to the minimum X coordinate value with the coordinates of the data having the minimum X coordinate value as the starting point if the coordinates of the data having the minimum X coordinate value are set as the standard point for selecting the first representative point. (3) The predetermined direction is a direction toward any Y-coordinate having a value greater than or equal to the maximum Y coordinate value with the coordinates of the data having the maximum Y coordinate value as the starting point if the coordinates of the data having the maximum Y coordinate value are set as the standard point for selecting the first representative point. (4) The predetermined direction is a direction toward any Y-coordinate having a value less than or equal to the minimum Y coordinate value with the coordinates of the data having the minimum Y coordinate value as the starting point if the coordinates of the data having the minimum Y coordinate value are set as the standard point for selecting the first representative point.

Further, if the respective data constituting the data group are set in the γ-θ polar coordinate system, the embodiment of the present invention can draw the distribution area indication line expressing only the contour of the distribution area of the data points in such a manner that the coordinate of data having a maximum γ value in the data group is set as the standard point for selecting the first representative point and any direction is set in a predetermined direction with respect to the standard point. The predetermined direction is a direction within ±90 degrees with respect to the θ value of the data having the maximum γ value in the data group.

Figure 13:
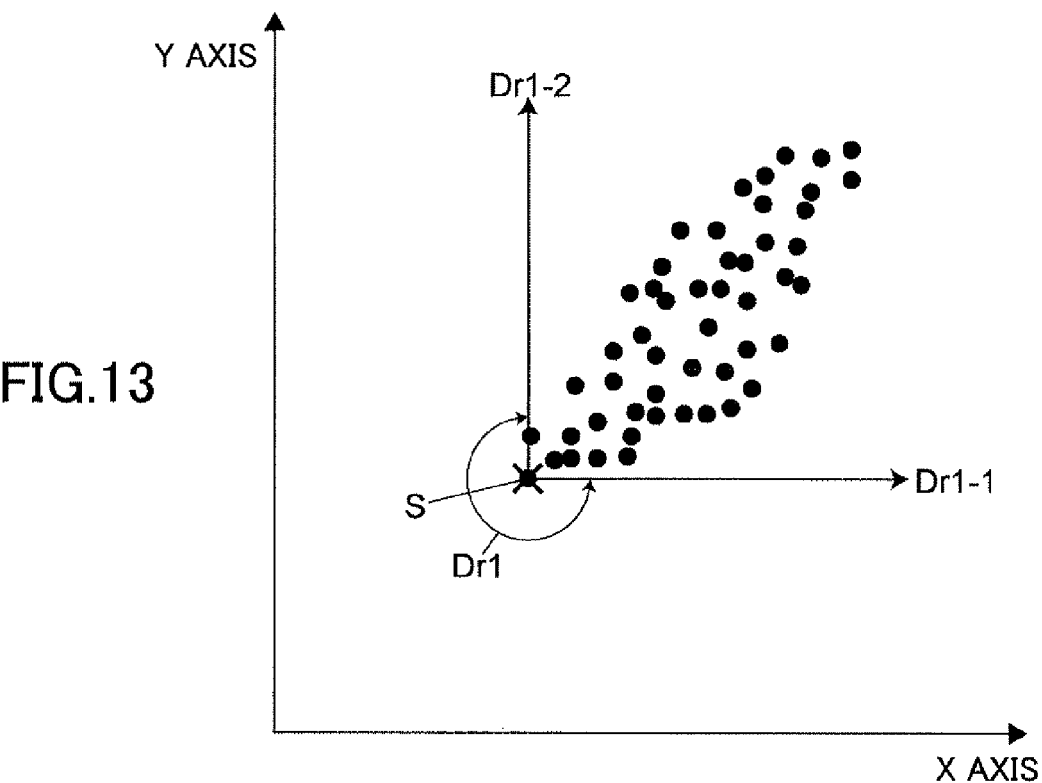
FIG. 13 is a graph for describing the position of the standard point for selecting the first representative point and an example of the range of any direction with respect to the standard point.

For example, it is assumed that the standard point S for selecting the first representative point is set at the coordinates of a data point that has a minimum X coordinate value and a minimum Y coordinate value, among plural data points on an XY coordinate plane shown in FIG. 13. Where the coordinates of the standard point S for selecting the first representative point are set as (Sx,Sy), no data points exist within a range X<Sx and a range Y<Sy. Accordingly, any direction set in the step of selecting the first representative point is only required to be within a range Dr1 from a direction Dr1-1, which is parallel to an X coordinate axis and toward the positive direction of the X coordinate axis, to a direction Dr1-2, which is parallel to a Y coordinate axis and toward the positive direction of the Y coordinate axis, in a clockwise direction. Note that directions within the range Dr1 includes the direction Dr1-1 and the direction Dr1-2.

Since the standard point S for selecting the first representative point is arranged at such a position, the representative point positioned inside the later drawn distribution area indication line is not selected in the first step of selecting the representative points and such a representative point is not selected in the second and third steps of selecting the representative points. As a result, the distribution area indication line expressing only the contour of the distribution area of the data points is drawn.

Further, the data point at the position of the coordinates of the standard point S for selecting the first representative point is necessarily selected as the representative point. Therefore, the data point may be set as the representative point before the third step of selecting the representative points. In this manner, the corresponding representative point is selected again as the representative point in the third step of selecting the representative points. Thus, the processing steps of selecting the representative points are completed. The time at which the data point at the position of the coordinates of the standard point S is selected as the representative point in advance may be set at any time so long as it is set before the time at which the corresponding representative point is selected again as the representative point in the third step of selecting the representative points.

Note that the standard point for selecting the first representative point may be arranged at any coordinates in the embodiment of the present invention. Therefore, in a case where the coordinates of any data in the data group are set as the standard point for selecting the first representative point, the coordinates of the standard point for selecting the first representative point are not limited to the coordinates of the data necessarily selected as the representative points described above.

Further, in the above embodiment of the present invention, the first step of selecting the representative points in which the first representative point is selected includes, but is not limited to, the step of setting the standard point for selecting the first representative point and the step of selecting the first representative point.

For example, in the first step of selecting the representative points, any one of the plural data points constituting the data group may be directly selected as the first representative point. In this case, the direction for selecting the representative point in the second step of selecting the representative points is any direction passing through the first representative point (the first standard point).

Moreover, if the respective data constituting the data group are data in an X-Y orthogonal coordinate system or an X-Y nonorthogonal coordinate system, the embodiments of present invention can draw the distribution area indication line expressing only the contour of the distribution area of the data points in such a manner that the coordinates of any of the data points necessarily selected as the representative points is set as the first representative point in the first step of selecting the representative points and a predetermined direction is set as the direction for selecting the representative point in the second step of selecting the representative points. (1) The predetermined direction is a direction toward any X-coordinate having a value greater than or equal to a maximum X coordinate value with the coordinates of the data having the maximum X coordinate value as a starting point if the coordinates of the data having the maximum X coordinate value are set as the first representative point. (2) The predetermined direction is a direction toward any X-coordinate having a value less than or equal to a minimum X coordinate value with the coordinates of the data having the minimum X coordinate value as the starting point if the coordinates of the data having the minimum X coordinate value are set as the first representative point. (3) The predetermined direction is a direction toward any Y-coordinate having a value greater than or equal to a maximum Y coordinate value with the coordinates of the data having the maximum Y coordinate value as the starting point if the coordinates of the data having the maximum Y coordinate value are set as the first representative point. (4) The predetermined direction is a direction toward any Y-coordinate having a value less than or equal to a minimum Y coordinate value with the coordinates of the data having the minimum Y coordinate value as the starting point if the coordinates of the data having the minimum Y coordinate value are set as the first representative point. However, the data point serving as the first representative point and the directions for selecting the representative points are not limited to them.

For example, a description is made with reference to FIG. 13, assuming that the data point (the data point at the symbol S) having a minimum X coordinate value and a minimum Y coordinate value is set as the first representative point. The direction for selecting the representative point set in the second step of selecting the representative points is only required to be within the range Dr1 from the direction Dr1-1, which is parallel to the X coordinate axis and toward the positive direction of the X coordinate axis, to the direction Dr1-2, which is parallel to the Y coordinate axis and toward the positive direction of the Y coordinate axis, in the clockwise direction. Here, the directions within the range Dr1 also includes the direction Dr1-1 and the direction Dr1-2.

Further, if the respective data constituting the data group are data in a $\gamma$-$\theta$ polar coordinate system, the data having a maximum $\gamma$ value in the data group are set as the first representative point in the first step of selecting the representative points and any one direction within ±90 degrees with respect to the $\theta$ value of the data constituting the first representative point may be set as the representative point in the second step of selecting the representative points.

Figure 14:
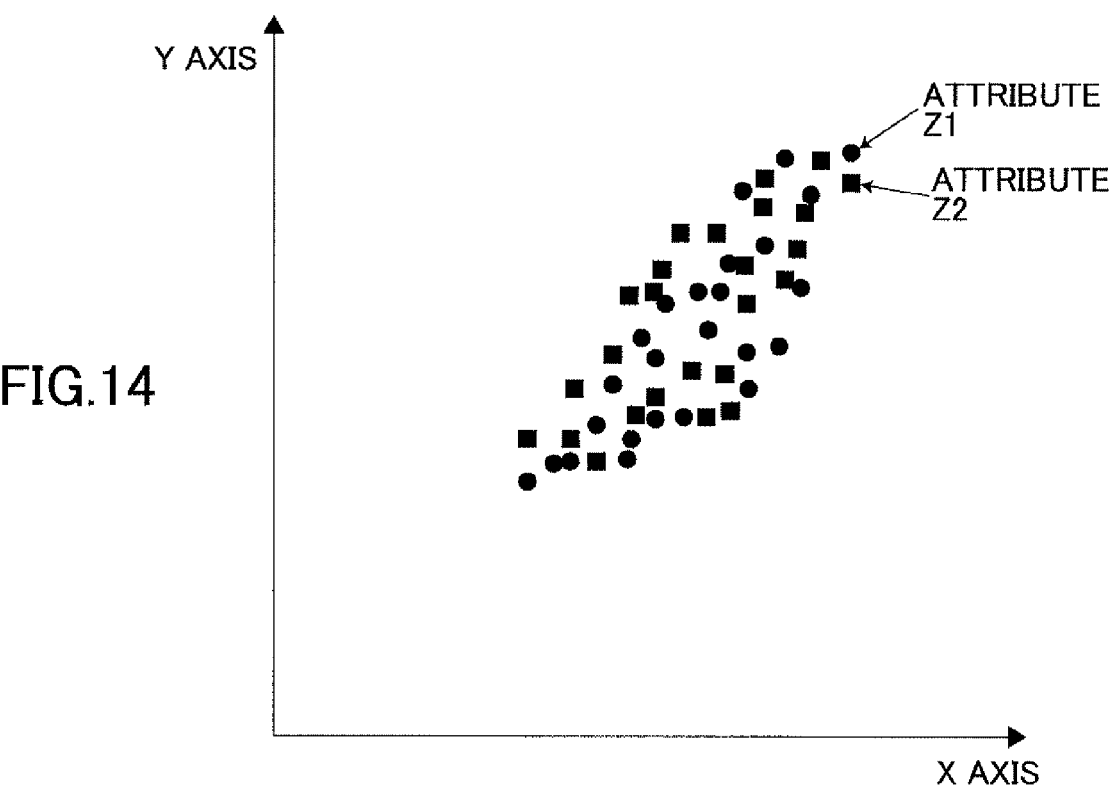
FIG. 14 is a graph illustrating the coordinate plane as layers using attributes Z1 and Z2, in which the numeric data A and the numeric data B shown in FIG. 2 are drawn.

FIG. 14 displays the coordinate plane as layers using attributes Z1 and Z2, in which the numeric data A and the numeric data B shown in FIG. 2 are drawn. In FIG. 14, the data points of the attributes Z1 are indicated by round marks, and the data points of the attributes Z2 are indicated by square marks.

In a case where the distribution areas of the data points of the attributes Z1 and Z2 are overlapped with each other as shown in FIG. 14, it is difficult to recognize them.

Figure 15:
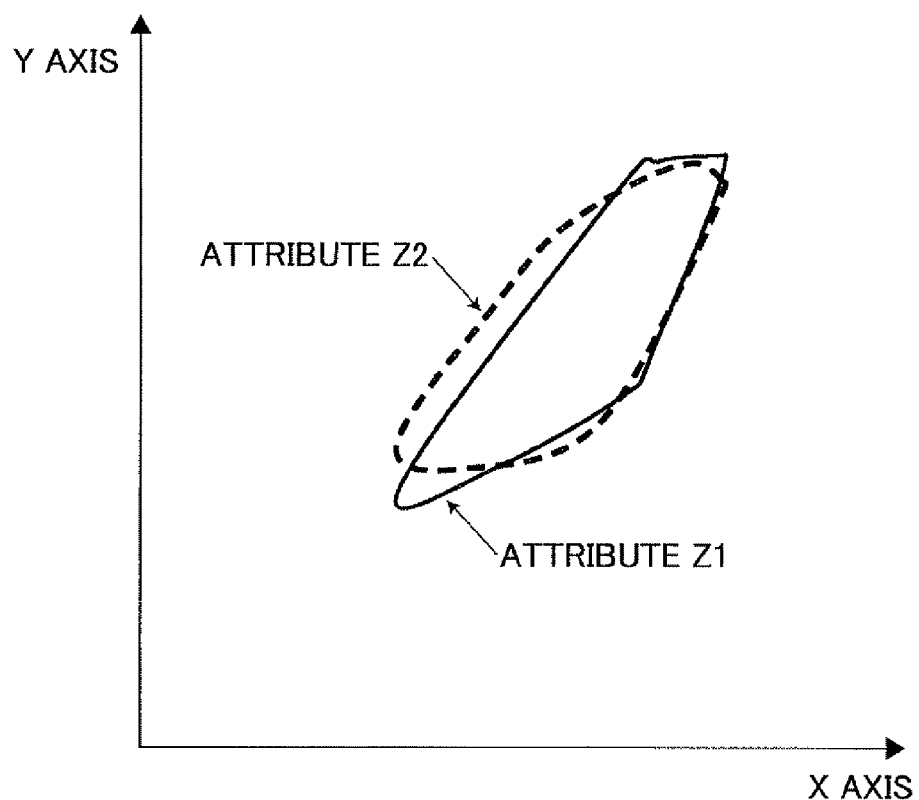
FIG. 15 is a graph showing a result obtained by finding the respective distribution area indication line for each of the attributes Z1 and Z2 with respect to the data points shown in FIG. 14 based on the embodiment described with reference to FIGS. 1 through 6.

FIG. 15 is a graph showing a result obtained by finding the corresponding respective distribution area indication line for each of the attributes Z1 and Z2 with respect to the data points shown in FIG. 14 based on the embodiment described with reference to FIGS. 1 through 6. A solid line indicates the distribution area indication line of the data points of the attributes Z1, and a dashed line indicates the distribution area indication line of the data points of the attributes Z2.

As evident from FIG. 15, finding the corresponding distribution area indication line for each of the attributes Z1 and Z2 makes it easier to recognize the distribution areas of the data points of the attributes Z1 and Z2.

Figure 16:
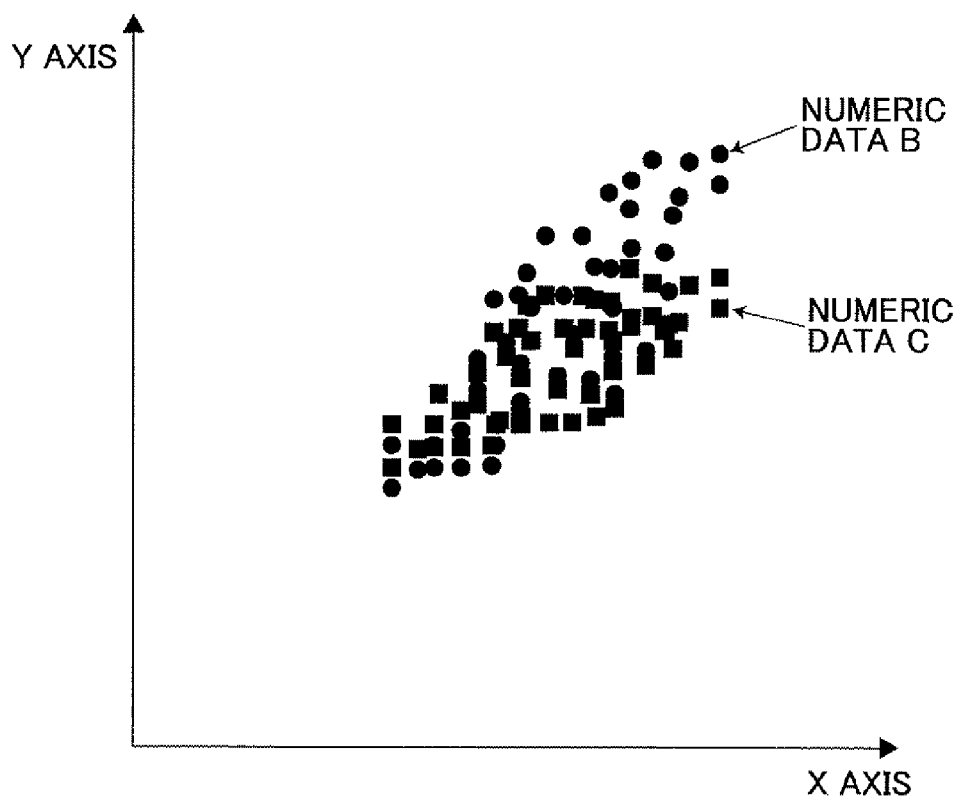
FIG. 16 is a graph illustrating the coordinate plane with layers, in which the numeric data B and the numeric data C with respect to the numeric data A shown in FIG. 2 are drawn.

FIG. 16 illustrates the coordinate plane with layers, in which the numeric data B and the numeric data C with respect to the numeric data A shown in FIG. 2 are drawn. In FIG. 16, the data points of the numeric data B are indicated by round marks, and the data points of the numeric data C are indicated by square marks.

Since the distribution areas of the data points of the numeric data B and C are overlapped with each other as shown in FIG. 16, it is difficult to recognize them.

Figure 17:
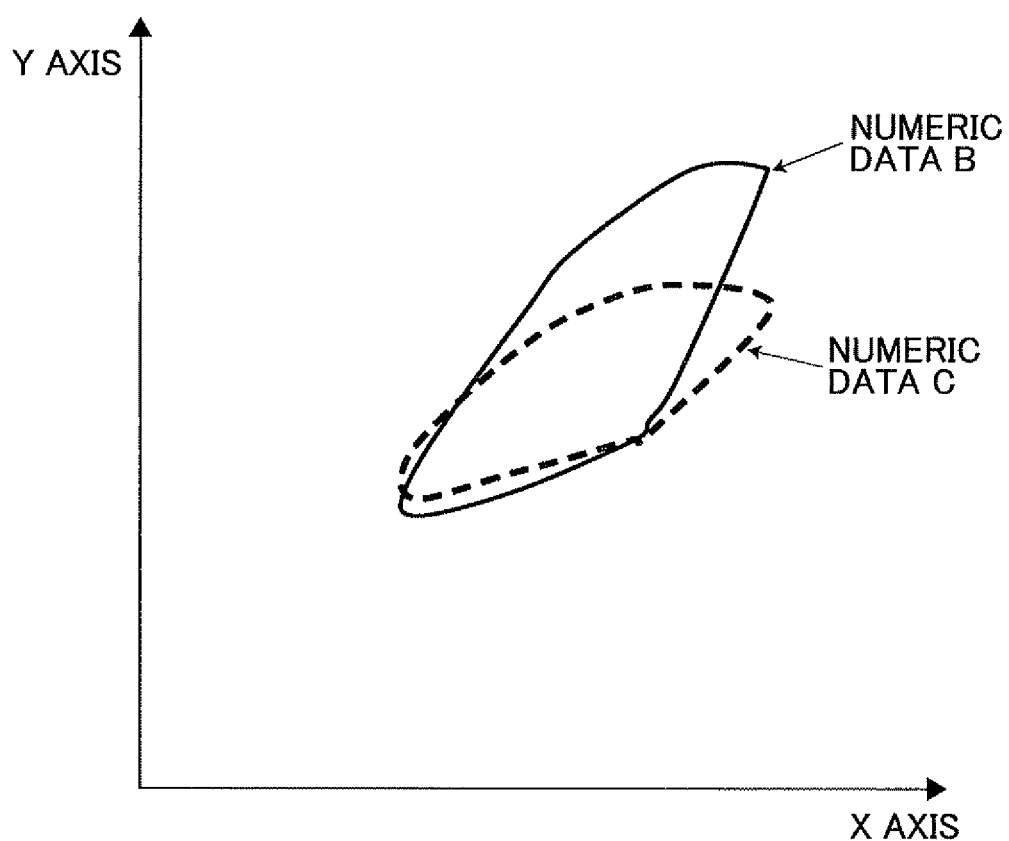
FIG. 17 is a graph showing a result obtained by finding the respective distribution area indication line for each of the numeric data B and C with respect to the data points shown in FIG. 16 based on the embodiment described with reference to FIGS. 1 through 6.

FIG. 17 is a graph showing a result obtained by finding the respective distribution area indication line for each of the numeric data B and C with respect to the data points shown in FIG. 16 based on the embodiment described with reference to FIGS. 1 through 6. A solid line indicates the distribution area indication line of the data points of the numeric data B, and a dashed line indicates the distribution area indication line of the data points of the numeric data C.

As evident from FIG. 17, finding the distribution area indication lines for the attributes numeric data B and C makes it easier to recognize the distribution areas of the data points of the numeric data B and C.

As described above, the method for drawing the distribution area according to the embodiment of the present invention is particularly effective for expressing the data points of two or more layers on the single coordinate plane in an overlapping manner.

In the above embodiment, the data points corresponding to the directions, in which minimum angles are formed with respect to the directions for selecting the representative points, are selected as the representative points in the second and third step of selecting the representative points. However, the data points corresponding to directions, in which maximum angles are formed with respect to the directions for selecting the representative points, may be selected as the representative points. In this case, in the third step of selecting the representative points, directions within 180 degrees in a rotation direction opposite to the rotation direction for selecting the representative points from the directions toward the immediately preceding standard points via the next standard points are set as next directions for selecting the representative points. Even in this case, the contour of the distribution area of the data points can be expressed by the distribution area indication line.

The processing steps in the embodiment described above can be achieved in such a manner that a program for processing the processing steps is created and a computer is caused to execute the program.

The present invention is not limited to the specifically disclosed embodiments, and variations and modifications may be made without departing from the scope of the present invention.

For example, the rotation direction for selecting the representative points is a clockwise direction in the above embodiment, but it may be a counterclockwise direction.

Further, the drawn coordinate plane is used in the above embodiment, but it is not necessarily required in the respective processing steps according to the embodiment of the present invention. In other words, the processing steps can be performed so long as a data group containing plural data having a pair of variables exists.

Furthermore, the standard points, the central points for making determination, the directions for making determination, the directions for selecting the representative points, and the like are shown on the drawn coordinate plane in the above embodiment, but they are not necessarily required in the respective processing steps according to the embodiment of the present invention.

Furthermore, the XY orthogonal coordinate plane is used in the embodiment, but any of an orthogonal coordinate plane, a nonorthogonal coordinate plane, and a polar coordinate plane may be used according to the embodiment of the present invention.

The embodiment of the present invention can be applied to displaying the distribution area of data points when a data group containing plural data having a pair of variables, e.g., a data group resulting from pattern defect inspection, foreign matter inspection, electrical characteristic examination, or the like performed after the processing of manufacturing a semiconductor device is displayed on a coordinate plane.

The present application is based on Japanese Priority Application No. 2010-091631 filed on Apr. 12, 2010, the entire contents of which are hereby incorporated herein by reference.

What is claimed is:

1. A method, performed by a computer executing a program of instructions embodied in a non-transitory medium, for drawing a distribution area of data points on a coordinate plane, the method comprising:

a first step of selecting representative points in which any one data point of a data group containing plural data having a pair of variables is selected as a first representative point on the coordinate plane where the data of the data group are expressed as points;

a second step of selecting the representative points in which assuming that one of a clockwise direction and a counterclockwise direction is set as a rotation direction for making selection, the first representative point is set as a first standard point, and any direction passing through the first standard point is set as a first direction for selecting a corresponding one of the representative points, the data point corresponding to a direction, in which a minimum angle is formed with respect to the first direction for selecting the corresponding one of the representative points in the rotation direction for making selection as viewed from the first direction for selecting the corresponding one of the representative points, among plural first directions of the data points toward the respective data points via the first standard point is selected as a second representative point;

a third step of selecting the representative points in which assuming that the second representative point or an immediately preceding representative point which is a representative point selected in the third step and a most recently selected representative point is set as a next standard point, the standard point used for selecting the immediately preceding representative point is set as an immediately preceding standard point, and any direction within 180 degrees in the rotation direction for making selection from a direction toward the immediately preceding standard point via the next standard point is set as a next direction for selecting the corresponding one of the representative points, the data point corresponding to a direction, in which a minimum angle is formed with respect to the next direction for selecting the corresponding one of the representative points in the rotation direction for making selection as viewed from the next direction for selecting the corresponding one of the representative points, among plural next directions of the data points toward the respective data points other than the immediately preceding representative point via the next standard point is selected as a next representative point, the third step repeatedly performing processing of selecting the next representative point; and a step of drawing the distribution area in which the representative points are connected by a line to draw a distribution area indication line.

2. The method for drawing the distribution area according to claim 1, wherein the first step of selecting the representative points includes
a step of setting the standard point for selecting the first representative point in which any point on the coordinate plane is set as the standard point for selecting the first representative point and
a step of selecting the first representative point in which assuming that one of the clockwise direction and the counterclockwise direction is set as a rotation direction for selecting the first representative point and any direction passing through the standard point for selecting the first representative point is set as a direction for selecting the first representative point, the data point corresponding to a direction, in which a minimum angle is formed with respect to the direction for selecting the first representative point in the rotation direction for selecting the first representative point as viewed from the direction for selecting the first representative point, among plural directions of the data points for selecting the first representative point toward the respective data points via the standard point for selecting the first representative point is selected as the first representative point, and the second step of selecting the representative points sets any direction within 180 degrees in the rotation direction for selecting the first representative point from a direction toward the standard point for selecting the first representative point via the first standard point as the first direction for selecting the corresponding one of the representative points.

3. The method for drawing the distribution area according to claim 2, wherein the step of setting the standard point for selecting the first representative point in the first step of selecting the representative points sets the standard point for selecting the first representative point at any point inside an area obtained by connecting all the data points by a line, the second step of selecting the representative points selects the second representative point with a direction toward the first standard point via the standard point for selecting the first representative point as the first direction for selecting the corresponding one of the representative points, and the third step of selecting the representative points selects the next representative point with a direction toward the next standard point via the immediately preceding point as the next direction for selecting the corresponding one of the representative points.

4. The method for drawing the distribution area according to claim 2, the method further comprising:

a step of setting a central point for making determination in which the central point for making determination used for determining when to complete the processing of selecting the representative points in the third step of selecting the representative points is set at any point inside the distribution area of the data points obtained by connecting all the data points by the line, the point having a coordinate different from a coordinate of the standard point for selecting the first representative point; wherein the step of selecting the first representative point selects the first representative point with a direction toward the standard point for selecting the first representative point via the central point for making determination as the direction for selecting the first representative point, and the third step of selecting the representative points recognizes the direction for selecting the first representative point as a first direction for making determination and completes processing of selecting the next representative point when a direction for making determination toward the representative point via the central point for making determination is rotated by 360 degrees or more with respect to the first direction for making determination in the rotation direction for making selection.

5. The method for drawing the distribution area according to claim 2, wherein the respective data of the data group are data in an X-Y orthogonal coordinate system or an X-Y nonorthogonal coordinate system, the step of setting the standard point for selecting the first representative point in the first step of selecting the representative points sets, as the standard point for selecting the first representative point, a coordinate of the data meeting at least one of the data having a maximum X coordinate value, the data having a minimum X coordinate value, the data having a maximum Y coordinate value, and the data having a minimum Y coordinate value among the data of the data group, and the step of selecting the first representative point in the first step of selecting the representative points sets the direction for selecting the first representative point to (1) a direction toward any X-coordinate having a value greater than or equal to the maximum X coordinate value with coordinates of the data point having the maximum X coordinate value as a starting point if the coordinates of the data point having the maximum X coordinate value are set as the standard point for selecting the first representative point, (2) a direction toward any X-coordinate having a value less than or equal to the minimum X coordinate value with coordinates of the data point having the minimum X coordinate value as the starting point if the coordinates of the data point having the minimum X coordinate value are set as the standard point for selecting the first representative point, (3) a direction toward any Y-coordinate having a value greater than or equal to the maximum Y coordinate value with coordinates of the data point having the maximum Y coordinate value as the starting point if the coordinates of the data point having the maximum Y coordinate value are set as the standard point for selecting the first representative point, and (4) a direction toward any Y-coordinate having a value less than or equal to the minimum Y coordinate value with coordinates of the data point having the minimum Y coordinate value as the starting point if the coordinates of the data point having the minimum Y coordinate value are set as the standard point for selecting the first representative point.

6. The method for drawing the distribution area according to claim 1, wherein the respective data of the data group are data in an X-Y orthogonal coordinate system or an X-Y nonorthogonal coordinate system, the first step of selecting the representative points sets, as the first representative point, a coordinate of the data meeting at least one of the data having a maximum X coordinate value, the data having a minimum X coordinate value, the data having a maximum Y coordinate value, and the data having a minimum Y coordinate value among the data of the data group, and the second step of selecting the representative points sets the first direction for selecting the corresponding one of the representative points to (1) a direction toward any X-coordinate having a value greater than or equal to the maximum X coordinate value with coordinates of the data point having the maximum X coordinate value as a starting point if the coordinates of the data point having the maximum X coordinate value are set as the first standard point, (2) a direction toward any X-coordinate having a value less than or equal to the minimum X coordinate value with coordinates of the data point having the minimum X coordinate value as the starting point if the coordinates of the data point having the minimum X coordinate value are set as the first standard point, (3) a direction toward any Y-coordinate having a value greater than or equal to the maximum Y coordinate value with coordinates of the data point having the maximum Y coordinate value as the starting point if the coordinates of the data point having the maximum Y coordinate value are set as the first standard point, and (4) a direction toward any Y-coordinate having a value less than or equal to the minimum Y coordinate value with coordinates of the data point having the minimum Y coordinate value as the starting point if the coordinates of the data point having the minimum Y coordinate value are set as the first standard point.

7. The method for drawing the distribution area according to claim 1, wherein the third step of selecting the representative points completes the processing of selecting the next representative point when a same data point is selected again as the representative point.

8. The method for drawing the distribution area according to claim 1, wherein the third step of selecting the representative points completes the processing of selecting the next representative point when at least two of the data points are selected again as the representative points.

9. The method for drawing the distribution area according to claim 1, wherein the step of drawing the distribution area connects the representative points by the line in an order in which the representative points are selected, thereby drawing the distribution area indication line.

10. The method for drawing the distribution area according to claim 9, wherein the step of drawing the distribution area does not connect the representative point selected before a time at which the representative point selected again is first selected.

11. The method for drawing the distribution area according to claim 1, wherein the step of drawing the distribution area connects, every time the representative point subsequent to the second representative point is selected, the selected representative point to the representative point immediately preceding the selected representative point by the line, thereby drawing the distribution area indication line.

12. The method for drawing the distribution area according to claim 11, wherein the step of drawing the distribution area deletes a line connected to the representative point selected before a time at which the representative point selected again is first selected.

13. The method for drawing the distribution area according to claim 1, wherein the second and third steps of selecting the representative points select, as the representative point, the data point corresponding to a direction in which a maximum angle is formed instead of the data point corresponding to the direction in which the minimum angle is formed, and the third step of selecting the representative points sets, as the next direction for selecting the corresponding one of the representative points, a direction within 180 degrees in a rotation direction opposite to the rotation direction for making selection from the direction toward the immediately preceding standard point via the next standard point.

14. A non-transitory computer-readable recording medium having recorded thereon a program for drawing the distribution area of the data points on the coordinate plane, the program causing a computer to perform a method for drawing a distribution area of data points on a coordinate plane, the method comprising:

a first step of selecting representative points in which any one data point of a data group containing plural data having a pair of variables is selected as a first representative point on the coordinate plane where the data of the data group are expressed as points;

a second step of selecting the representative points in which assuming that one of a clockwise direction and a counterclockwise direction is set as a rotation direction for making selection, the first representative point is set as a first standard point, and any direction passing through the first standard point is set as a first direction for selecting a corresponding one of the representative points, the data point corresponding to a direction in which a minimum angle is formed with respect to the first direction for selecting the corresponding one of the representative points in the rotation direction for making selection as viewed from the first direction for selecting the corresponding one of the representative points, among plural first directions of the data points toward the respective data points via the first standard point is selected as a second representative point;

a third step of selecting the representative points in which assuming that the second representative point or an immediately preceding representative point which is a representative point selected in the third step and a most recently selected representative point is set as a next standard point, the standard point used for selecting the immediately preceding representative point is set as an immediately preceding standard point, and any direction within 180 degrees in the rotation direction for making selection from a direction toward the immediately preceding standard point via the next standard point is set as a next direction for selecting the corresponding one of the representative points, the data point corresponding to a direction in which a minimum angle is formed with respect to the next direction for selecting the corresponding one of the representative points in the rotation direction for making selection as viewed from the next direction for selecting the corresponding one of the representative points, among plural next directions of the data points toward the respective data points other than the immediately preceding representative point via the next standard point is selected as a next representative point, the third step repeatedly performing processing of selecting the next representative point; and a step of drawing the distribution area in which the representative points are connected by a line to draw a distribution area indication line.

* * * * *